United States Patent
Pi

(10) Patent No.: US 8,116,271 B2
(45) Date of Patent: Feb. 14, 2012

(54) METHODS AND APPARATUS TO ALLOCATE ACKNOWLEDGEMENT CHANNELS

(75) Inventor: Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 12/210,864

(22) Filed: Sep. 15, 2008

(65) Prior Publication Data
US 2009/0201863 A1 Aug. 13, 2009

Related U.S. Application Data

(60) Provisional application No. 61/006,955, filed on Feb. 7, 2008.

(51) Int. Cl.
*H04W 4/00* (2009.01)

(52) U.S. Cl. .......... 370/329; 370/465

(58) Field of Classification Search .......... 370/203–204, 370/208, 252, 328–329, 437, 441, 465, 479–480, 370/230, 230.1, 231, 235–236, 335–336, 370/338, 341–343, 345; 455/436–439, 442, 455/450, 451, 452.1–452.2, 453, 455, 509–510, 455/515–516

See application file for complete search history.

(56) References Cited

U.S. PATENT DOCUMENTS

| | | | |
|---|---|---|---|
| 7,158,504 B2* | 1/2007 | Kadaba et al. | 370/348 |
| 7,283,508 B2* | 10/2007 | Choi et al. | 370/341 |
| 7,315,527 B2* | 1/2008 | Wei et al. | 370/328 |
| 7,496,075 B2* | 2/2009 | Kwak et al. | 370/335 |
| 7,920,516 B2* | 4/2011 | Nishio et al. | 370/328 |
| 7,948,958 B2* | 5/2011 | Vimpari et al. | 370/342 |
| 7,961,680 B2* | 6/2011 | Park et al. | 370/329 |
| 2006/0114936 A1* | 6/2006 | Paffen | 370/469 |
| 2007/0081491 A1 | 4/2007 | Kim et al. | |
| 2008/0232307 A1* | 9/2008 | Pi et al. | 370/328 |
| 2008/0253300 A1* | 10/2008 | Wakabayashi et al. | 370/252 |

(Continued)

FOREIGN PATENT DOCUMENTS

KR 2003-0037398 5/2003

(Continued)

OTHER PUBLICATIONS

Notification of Transmittal of the International Search Report and the Written Opinion of the International Searching Authority, or the Declaration dated Jul. 13, 2009 in connection with PCT Application No. PCT/KR2009/000567.

(Continued)

*Primary Examiner* — Kevin Mew

(57) ABSTRACT

A method and apparatus allocate acknowledgement channels in a communication network. A linking scheme is established between indices of physical hybrid automatic repeat-request indicator channels (PHICHs), and a combination of indices of control channel elements (CCEs) or indices of physical resource blocks (PRBs) and indices of demodulation reference signals (DMRSs). A scheduling grant is transmitted to a user equipment (UE) by using a plurality of CCEs. In response to receiving a data packet and a DMRS from the UE, an index of a PHICH within the plurality of PHICHs is determined based on at least one index of the CCEs used to transmit the scheduling grant or at least one index of the PRBs used to transmit the data packet, and an index of the DMRS in accordance with the linking scheme established. The BS transmits an acknowledgement signal to the UE using the PHICH indicated by the determined index.

28 Claims, 27 Drawing Sheets

U.S. PATENT DOCUMENTS

| | | | |
|---|---|---|---|
| 2009/0022098 A1* | 1/2009 | Novak et al. | 370/329 |
| 2009/0181687 A1* | 7/2009 | Tiirola et al. | 455/450 |
| 2009/0196195 A1* | 8/2009 | Gerstenberger et al. | 370/252 |
| 2010/0098006 A1* | 4/2010 | Golitschek Edler Von Elbwart et al. | 370/329 |
| 2010/0157916 A1* | 6/2010 | Kim et al. | 370/329 |
| 2011/0122825 A1* | 5/2011 | Lee et al. | 370/328 |

FOREIGN PATENT DOCUMENTS

| | | |
|---|---|---|
| KR | 10-2005-0091599 | 9/2005 |
| KR | 10-2005-0102852 | 10/2005 |

OTHER PUBLICATIONS

3GPP TSG-RAN WG1 Meeting #51bis, R1-080135, *"Implicit Assignment of PHICH"*, Sevilla, Spain, Jan. 14-18, 2008.

3GPP TSG RAN WG1 Meeting #51bis, R1-080301, *"PHICH and Mapping to PHICH Groups"*, Sevilla, Spain, Jan. 14-18, 2008.

3GPP TSG-RAN Working Group 1 #52, R1-080668, *"PHICH Linking to Downlink CCE"*, Sorrento, Italy, Feb. 11-15, 2008.

* cited by examiner

| 0 | 3 | 6 | 9 | 12 | 15 | 18 | 21 |

| 1 | 4 | 7 | 10 | 13 | 16 | 19 | 22 |

| 2 | 5 | 8 | 11 | 14 | 17 | 20 | 23 |

Increment group index first, then the sequence index

FIG. 5(b)

METHODS AND APPARATUS TO ALLOCATE ACKNOWLEDGEMENT CHANNELS

CLAIM OF PRIORITY

This application makes reference to, incorporates the same herein, and claims all benefits accruing under 35 U.S.C. §119 from a provisional application earlier filed in the U.S. Patent & Trademark Office on 7 Feb. 2008 and there duly assigned Ser. No. 61/006,955.

BACKGROUND OF THE INVENTION

1. Field of the Invention

The present invention relates to methods and apparatus for allocating acknowledgement channels in a communication network.

2. Description of the Related Art

This application, pursuant to 37 C.F.R. §1.57, incorporates by reference the following publications:

[1] R1-080135, "Implicit assignment of PHICH", Panasonic;

[2] R1-080301, "PHICH and mapping to PHICH groups", Nokia, Nokia Siemens Networks; and

[3] R1-080668, "PHICH linking to downlink CCE", Samsung, Panasonic.

Telecommunication enables transmission of data over a distance for the purpose of communication between a transmitter and a receiver. The data is usually carried by radio waves and is transmitted using a limited transmission resource. That is, radio waves are transmitted over a period of time using a limited frequency range.

In a contemporary communication system, the information to be transmitted are first encoded and then modulated to generate multiple modulation symbols. The symbols are subsequently mapped into transmission resource. Usually, the transmission resource available for data transmission is segmented into a plurality of equal duration time and frequency slots, so called resource elements. A single resource element or multiple resource elements may be allocated for transmitting the data. When data is transmitted, a control signal may accompany the data to carry information regarding the allocation of the resource elements for the current data transmission. Therefore, when a receiver receives the data and the control signal, the receiver may derive the information regarding resource allocation used for data transmission from the control signal and decodes the received data using the derived information.

In Third ($3^{rd}$) Generation Partnership Project Long Term Evolution (3GPP LTE) systems, certain resource elements are allocated for control signal transmission. Therefore, the data symbols may be mapped into the resource elements that are not allocated for control signal transmission. Each data transmission carries information bits of one or multiple transport blocks. When a transport block is larger than the largest code block size, the information bits in a transport block may be segmented into multiple code blocks. The process of dividing the information bits in a transport block into multiple code blocks is called code block segmentation. Due to the limited selection of code block sizes and the attempt to maximize packing efficiency during the code block segmentation, the multiple code blocks of a transport block may have different sizes. Each code block will be encoded, interleaved, rate matched, and modulated. Therefore, the data symbols for a transmission may consist of modulation symbols of multiple code blocks.

Currently, a few methods were proposed to allocate the Physical Hybrid Automatic Repeat-reQuest (HARQ) Indicator Channel (PHICH). PHICH is also known as downlink acknowledgement channels that are used by base station (Node B) to acknowledge (ACK) or negatively acknowledge (NAK) uplink transmissions by user equipments (UEs).

Methods to link the PHICH allocation to the Control Channel Elements (CCE) of Physical Downlink Control Channel (PDCCH) were proposed in Reference [1] and Reference [3]. These methods allow efficient PHICH allocation, but suffer from the complexity of handling CCE scheduling in packet data control channel (PDCCH).

Methods to link the PHICH allocation to uplink Physical Resource Blocks (PRB) were proposed in Reference [2]. These methods allow simple PHICH allocation and CCE scheduling, but the resources allocated for PHICH are often inefficiently utilized.

SUMMARY OF THE INVENTION

It is therefore an object of the present invention to provide an improved method and circuitry for allocate acknowledgement channels.

It is another object of the present invention to provide a simple method and circuitry for allocate acknowledgement channels.

It is still another object of the present invention to provide a simple method and circuitry for allocate acknowledgement channels to efficiently utilize the transmission resources.

According to one aspect of the present invention, a linking scheme is established between indices of a plurality of physical hybrid automatic repeat-request indicator channels (PHICHs), and a combination of indices of control channel elements (CCEs) and indices of demodulation reference signals (DMRSs). A first node transmits a scheduling grant to a second node by using a plurality of control channel elements (CCEs). In response to receiving a data packet and a demodulation reference signal (DMRS) from the second node, the first node determines an index of a physical hybrid automatic repeat-request indicator channel (PHICH) within the plurality of physical hybrid automatic repeat-request indicator channels (PHICHs) in dependence upon at least one index of the control channel elements (CCEs) used to transmit the scheduling grant, and an index of the transmitted demodulation reference signal (DMRS) in accordance with the linking scheme established. Finally, the first node transmits an acknowledgement signal to the second node by using the physical hybrid automatic repeat-request indicator channel (PHICH) indicated by the determined index of the physical hybrid automatic repeat-request indicator channel (PHICH).

The plurality of physical hybrid automatic repeat-request indicator channels (PHICHs) may be equally divided into a plurality of groups.

The first node may determine the physical hybrid automatic repeat-request indicator channel (PHICH) within the plurality of physical hybrid automatic repeat-request indicator channels (PHICHs) in dependence upon a combination of an index of a first control channel element (CCE) used to transmit the scheduling grant, and the index of the transmitted demodulation reference signal (DMRS) in accordance with the linking scheme established.

The linking scheme may be established by:

$$\text{Index}_{PHICH} = (\text{Index}_{1st\ CCE}\ \%\ N_{group}) \times S_{group} + (\text{Index}_{DMRS} + \lfloor \text{Index}_{1st\ CCE}/N_{group} \rfloor) \%\ S_{group},$$

where $\text{Index}_{PHICH}$ denotes the index of the physical hybrid automatic repeat-request indicator channel (PHICH), $Index_{1st\ CCE}$ denotes the index of the first control channel element (CCE) used to transmit the scheduling grant, $Index_{DMRS}$ denotes the index of the transmitted demodulation reference signal (DMRS), $N_{group}$ denotes the quantity of the plurality of groups of physical hybrid automatic repeat-request indicator channels (PHICHs), and $S_{group}$ denotes the quantity of the physical hybrid automatic repeat-request indicator channels (PHICHs) in each group.

Alternatively, the linking scheme may be established by:

$$Index_{PHICH} = Index_{1st\ CCE} \% N_{group} + ((Index_{DMRS} + \lfloor Index_{1st\ CCE}/N_{group}\rfloor)\% S_{group}) \times N_{group}.$$

Still alternatively, the linking scheme may be established by:

$$Index_{PHICH} = (Index_{1st\ CCE} \% N_{group}) \times S_{group} + Index_{DMRS}.$$

Still alternatively, the linking scheme may be established by:

$$Index_{PHICH} = Index_{1st\ CCE} \% N_{group} + Index_{DMRS} \times N_{group}.$$

According to another aspect of the present invention, a linking scheme is established between indices of a plurality of physical hybrid automatic repeat-request indicator channels (PHICH), and a combination of indices of physical resource blocks (PRBs) and indices of demodulation reference signals. A first node transmits a scheduling grant to a second node that allocates a plurality of physical resource blocks (PRBs) for the second node to transmit a data packet. In response to receiving a data packet and a demodulation reference signal (DMRS) from the second node, the first node determines an index of a physical hybrid automatic repeat-request indicator channel (PHICH) within the plurality of physical hybrid automatic repeat-request indicator channels (PHICHs) in dependence upon at least one index of the physical resource blocks (PRBs) used to transmit the scheduling grant, and an index of the transmitted demodulation reference signal (DMRS) in accordance with the linking scheme established. Finally, the first node transmits an acknowledgement signal to the second node by using the physical hybrid automatic repeat-request indicator channel (PHICH) indicated by the determined index of the physical hybrid automatic repeat-request indicator channel (PHICH).

The first node may determine the physical hybrid automatic repeat-request indicator channel (PHICH) within the plurality of physical hybrid automatic repeat-request indicator channels (PHICHs) in dependence upon a combination of an index of a first physical resource block (PRB) used to transmit the scheduling grant, and the index of the transmitted demodulation reference signal (DMRS) in accordance with the linking scheme established.

The linking scheme may be established by:

$$Index_{PHICH} = (Index_{1st\ PRB} \% N_{group}) \times S_{group} + (Index_{DMRS} + \lfloor Index_{1st\ PRB}/N_{group}\rfloor)\% S_{group},$$

where $Index_{PHICH}$ denotes the index of the physical hybrid automatic repeat-request indicator channel (PHICH), $Index_{1st\ PRB}$ denotes the index of the first physical resource block (PRB) used to transmit the scheduling grant, $Index_{DMRS}$ denotes the index of the transmitted demodulation reference signal (DMRS), $N_{group}$ denotes the quantity of the plurality of groups of physical hybrid automatic repeat-request indicator channels (PHICHs), and $S_{group}$ denotes the quantity of the physical hybrid automatic repeat-request indicator channels (PHICHs) in each group.

Alternatively, the linking scheme may be established by:

$$Index_{PHICH} = Index_{1st\ PRB} \% N_{group} + ((Index_{DMRS} + \lfloor Index_{1st\ PRB}/N_{group}\rfloor)\% S_{group}) \times N_{group}.$$

Still alternatively, the linking scheme may be established by:

$$Index_{PHICH} = (Index_{1st\ PRB} \% N_{group}) \times S_{group} + Index_{DMRS}.$$

Still alternatively, the linking scheme may be established by:

$$Index_{PHICH} = Index_{1st\ PRB} \% N_{group} + Index_{DMRS} \times N_{group}.$$

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
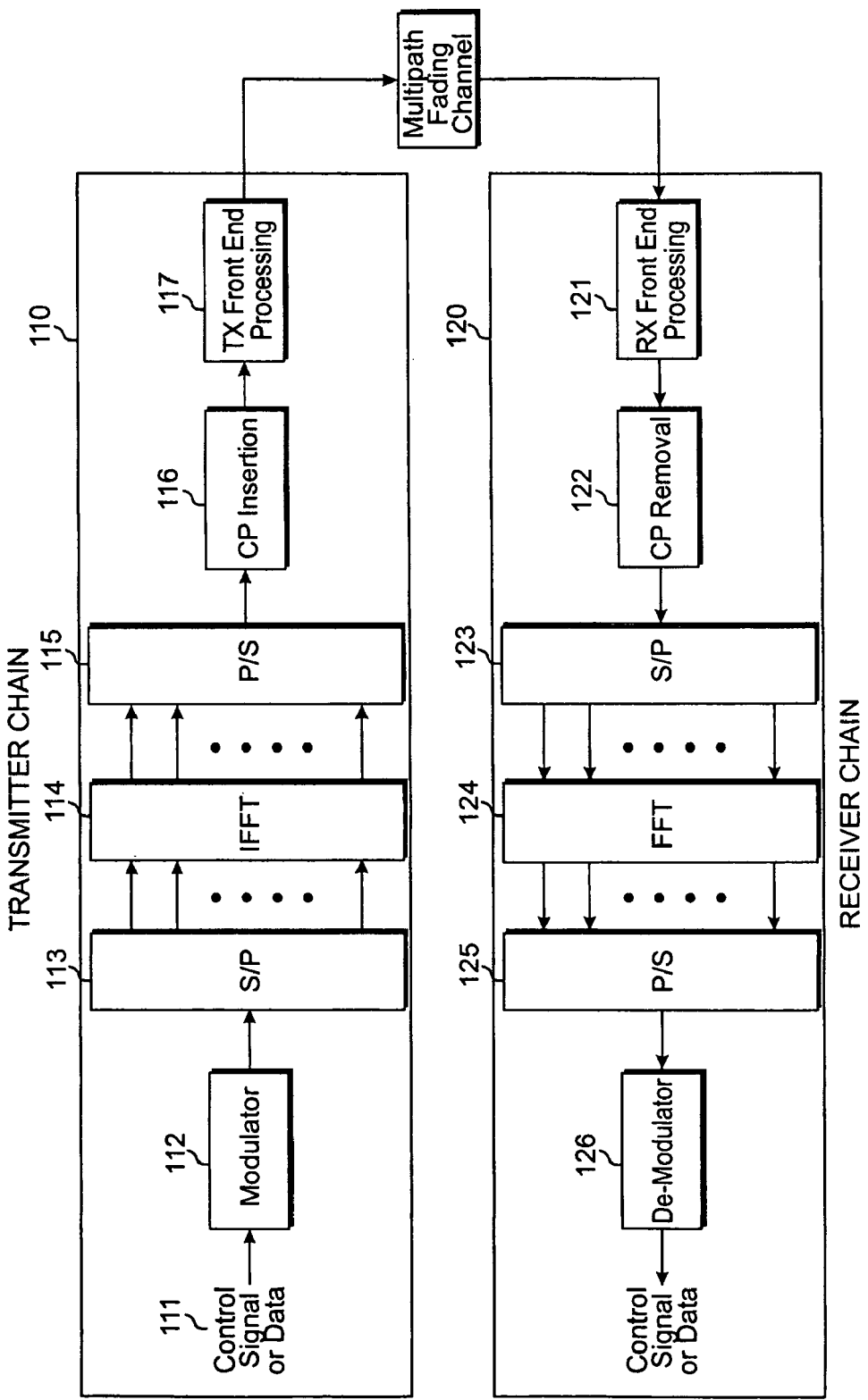
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117 and at least one antenna (not shown), or fixed wire or cable. The signal is transmitted from one or more antennas driven by unit 117 via the atmosphere and is subjected to multipath fading to arrive at a receiver. Note that the multipath fading channel illustrated in FIG. 1 refers to a transmission media (for example, atmosphere), and the multipath fading channel is not a component connected to the receiver, nor to the transmitter. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 2:
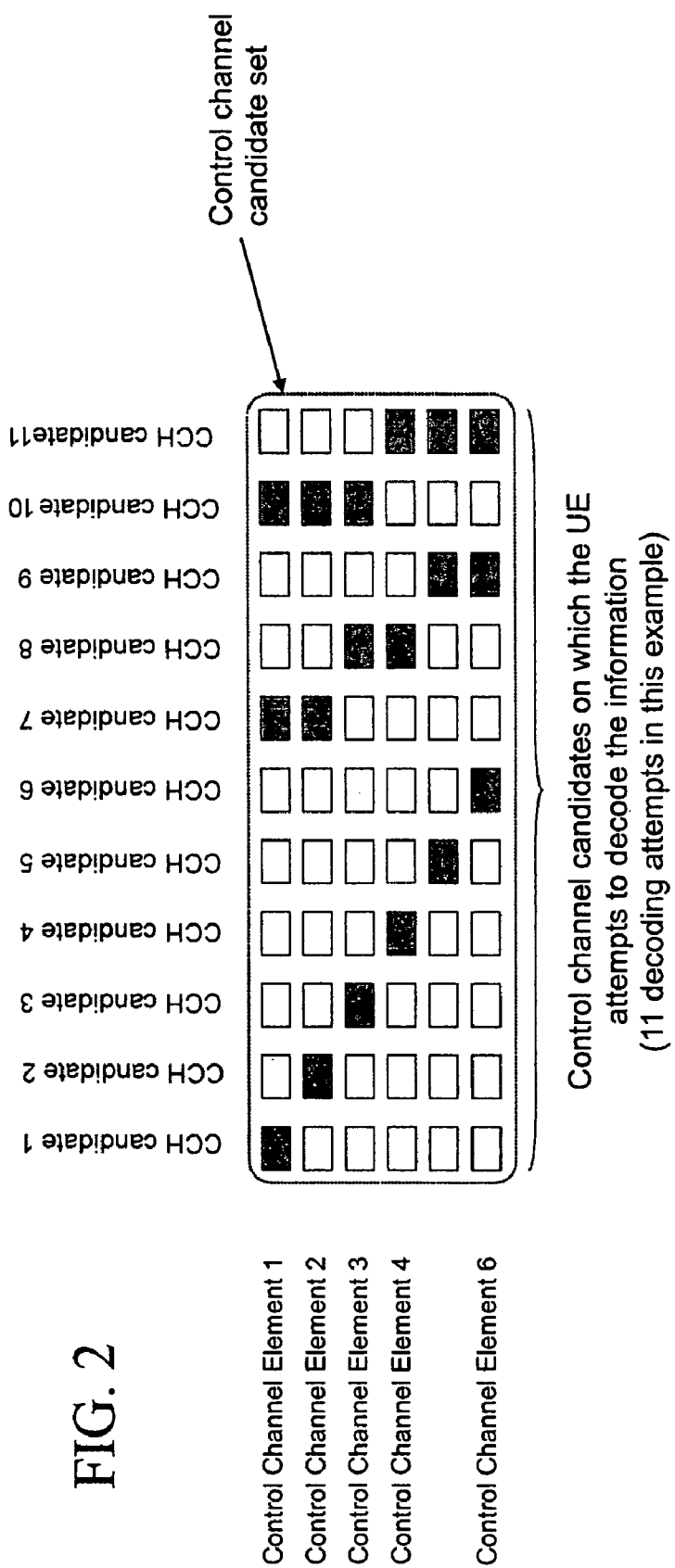
FIG. 2 is an illustration of LTE downlink control channel elements.

In LTE systems, some resources, namely control channel elements, are reserved for downlink control channel transmission. Control channel candidate set can be constructed based on the control channel elements reserved for downlink control channels. Each downlink control channel can be transmitted on one of the control channel candidate set. An example of control channel elements and control channel candidate set is shown in FIG. 2. In this example, 11 control channel candidate sets can be constructed on 6 control channel elements. In the rest of the document, we will refer to these control channel candidate sets as control channel resource sets, or simply, resource sets.

Figure 3:
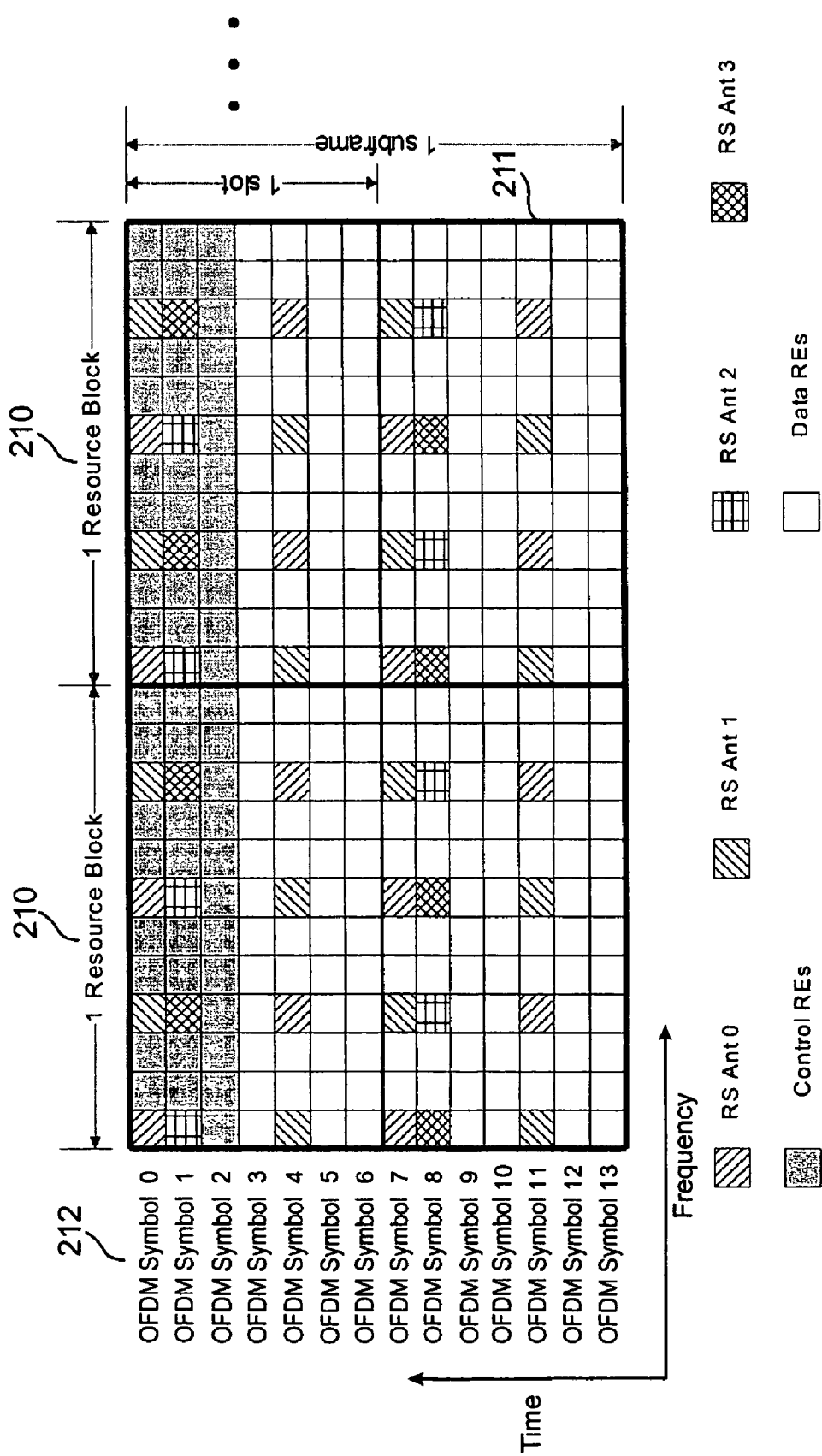
FIG. 3 is an illustration of LTE downlink subframe structure.

The downlink subframe structure in a 3GPP LTE system is shown in FIG. 3. In the 3GPP LTE system, a time and frequency resource can be divided into a plurality of resource blocks 210 (RB). Each resource block 210 can be further divided into a plurality of resource elements 211 in a time and frequency domain. As shown in FIG. 3, a single OFDM symbol can be transmitted using a row of resource elements corresponding to the same period of time. In a typical configuration, each subframe is 1 ms long, containing 14 OFDM symbols. Assume the OFDM symbols in a subframe are indexed from 0 to 13. Reference symbols (RS) for antenna 0 and 1 are located in OFDM symbol 0, 4, 7, and 11. If present, reference symbols (RS) for antennas 2 and 3 are located in OFDM symbols 2 and 8. Control channel signals, including Control Channel Format Indicator (CCFI), acknowledgement signal (ACK), packet data control channel (PDCCH) signal, are transmitted in the first one, or two, or three OFDM symbols. The number of OFDM symbols used for control channel signals is indicated by CCFI. Data channel signals, i.e., Physical Downlink Shared Channel (PDSCH) signals, are transmitted in other OFDM symbols.

Figure 4:
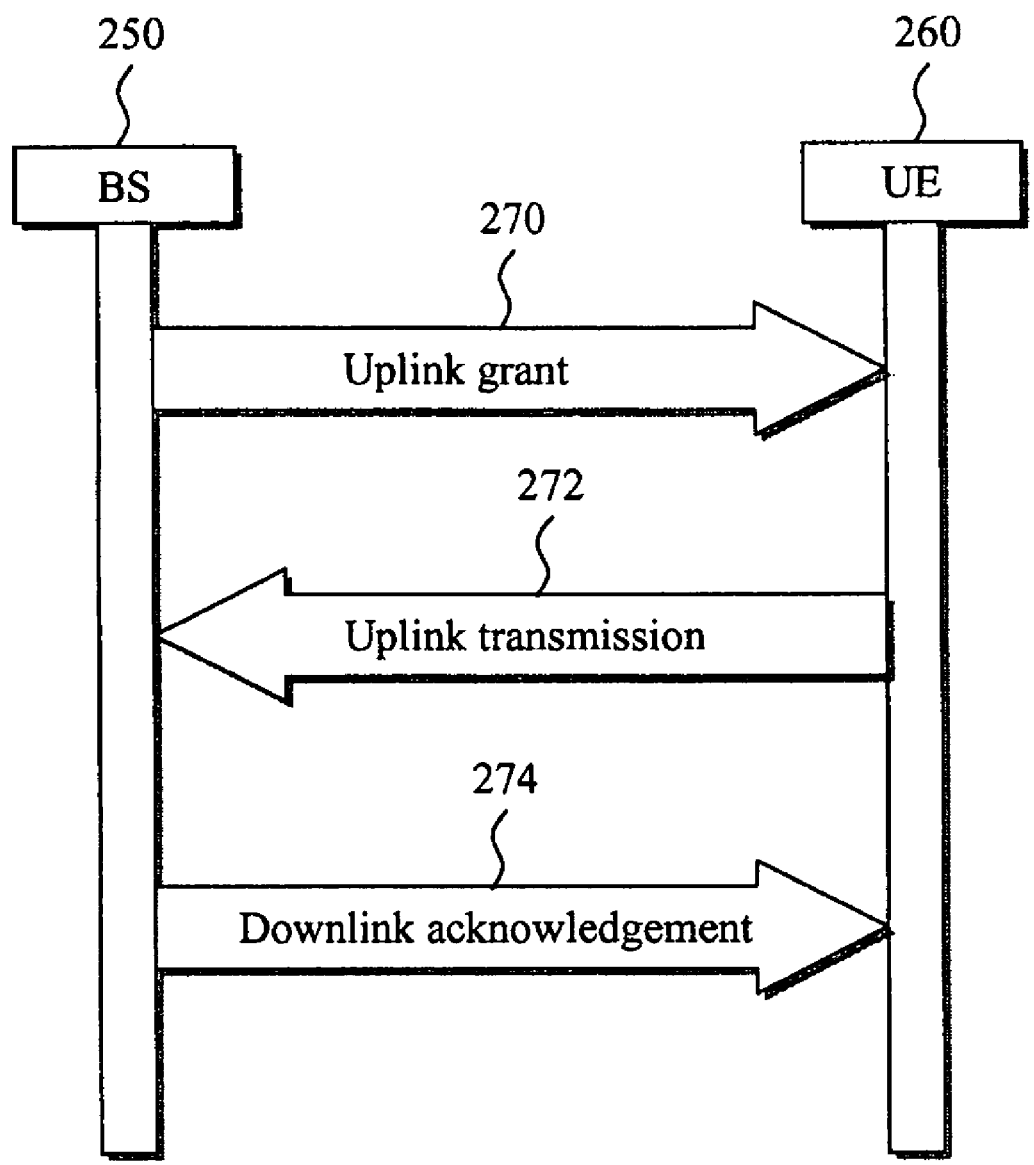
FIG. 4 illustrates a communication scheme between a base station (BS) and a unit of user equipment (UE) in packet-based wireless data communication systems.

FIG. 4 illustrates a communication scheme between a base station (BS) and a unit of user equipment (UE) in packet-based wireless data communication systems. First, BS 250 transmits an uplink grant to UE 260 to schedule an uplink transmission, via step 270. In response to the uplink grant, UE 260 transmits data and demodulation reference signal (DMRS) to BS 250. After receiving the data transmitted from UE 260, BS 250 may transmit an acknowledgement message or a negative acknowledgement message by using downlink acknowledgement channels.

In this invention, we provide efficient design of allocating acknowledgement channels.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings. In the following illustrations, we use the PHICH (downlink acknowledgement channels) in the 3GPP LTE systems as an example. However, the technique illustrated here can certainly be used in allocating uplink acknowledgement channels and other signaling or control channels and in other systems whenever applicable.

Figure 5A:
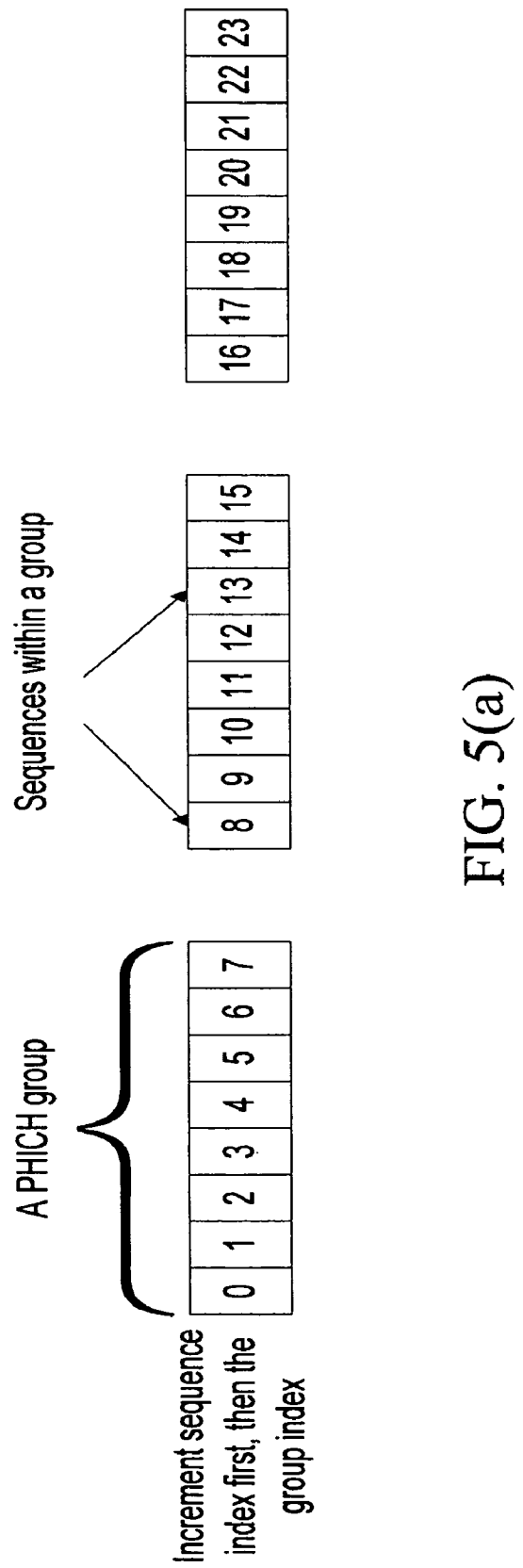
FIGS. 5(a) and (b) schematically illustrates two different Physical Hybrid Automatic Repeat-reQuest (HARQ) Indicator Channel (PHICH) indexing schemes.

First, we provide two different ACK channel indexing schemes. PHICH channels are transmitted in groups, with each group containing $S_{group}$ PHICH channels. Denote the total number of PHICH channels as $N_{PHICH}$. Denote the number of PHICH groups as $N_{group}=N_{PHICH}/S_{group}$. Each PHICH channel in a PHICH group is transmitted using a different spreading sequence, and/or on a different In-phase or Quadrature-phase branch. For the sake of simplicity, we denote the index of a PHICH channel within a group as $Index_{sequence}$. We also denote the index of the PHICH group that a PHICH channel belongs to as $Index_{group}$. As shown in FIG. 5(a), one indexing scheme is to increment the sequence index first, and then the group index, thus, $$Index_{PHICH}=Index_{group} \times S_{group}+Index_{sequence} \quad (1)$$

Alternatively, as shown in FIG. 5(b), we can index the PHICH channels by incrementing the group index first, and then the sequence index. Thus, $$Index_{PHICH}=Index_{group}+Index_{sequence} \times N_{group} \quad (2)$$

In a first embodiment according to the principles of the present invention, the PHICH that acknowledges an uplink transmission is allocated according to at least one index of the CCEs used in transmitting the uplink grant for the said uplink transmission, and the index of the demodulation reference signal (DMRS) used in the said uplink transmission. The demodulation reference signal (DMRS) is transmitted together with the uplink data packet. The purpose of the DMRS is to aid the BS receiver to detect the uplink transmission. A number of different sequences can be used in generating the DMRS. The UE uses one of these sequences in generating the DMRS for one uplink transmission, which is indicated by the DMRS index. For example, the PHICH can be allocated by the first CCE index of the Physical Downlink Control Channel (PDCCH) used in transmitting the uplink grant and the index of the DMRS. Note that the index of the DMRS can be broadly defined as the index of the DMRS sequence, or the index of the cyclic shift of the DMRS sequence, or the combination of both. Denote the index of the first CCE used for uplink grant as $\text{Index}_{1st\ CCE}$ Denote the index of the DMRS for uplink transmission as $\text{Index}_{DMRS}$. The PHICH allocation can be determined by:

$$\text{Index}_{group} = \text{Index}_{1st\ CCE} \% N_{group} \quad (3)$$

$$\text{Index}_{sequence} = (\text{Index}_{DMRS} + \lfloor \text{Index}_{1st\ CCE}/N_{group} \rfloor)\% S_{group} \quad (4)$$

Note $\lfloor x \rfloor$ is the largest integer smaller than or equal to x. Note that x % y is the remainder of x divided by y. Denote the allocated PHICH index for the uplink HARQ process as $\text{Index}_{PHICH}$. Based on Equation (3) and Equation (4), the PHICH index can be calculated as in Equation (1) or Equation (2). In other words, we can calculate the PHICH index by:

$$\text{Index}_{PHICH} = (\text{Index}_{1st\ CCE} \% N_{group}) \times S_{group} + (\text{Index}_{DMRS} + \lfloor \text{Index}_{1st\ CCE}/N_{group} \rfloor)\% S_{group} \quad (5)$$

or $$\text{Index}_{PHICH} = \text{Index}_{1st\ CCE} \% N_{group} + ((\text{Index}_{DMRS} + \lfloor \text{Index}_{1st\ CCE}/N_{group} \rfloor)\% S_{group}) \times N_{group} \quad (6)$$

Figure 6A:
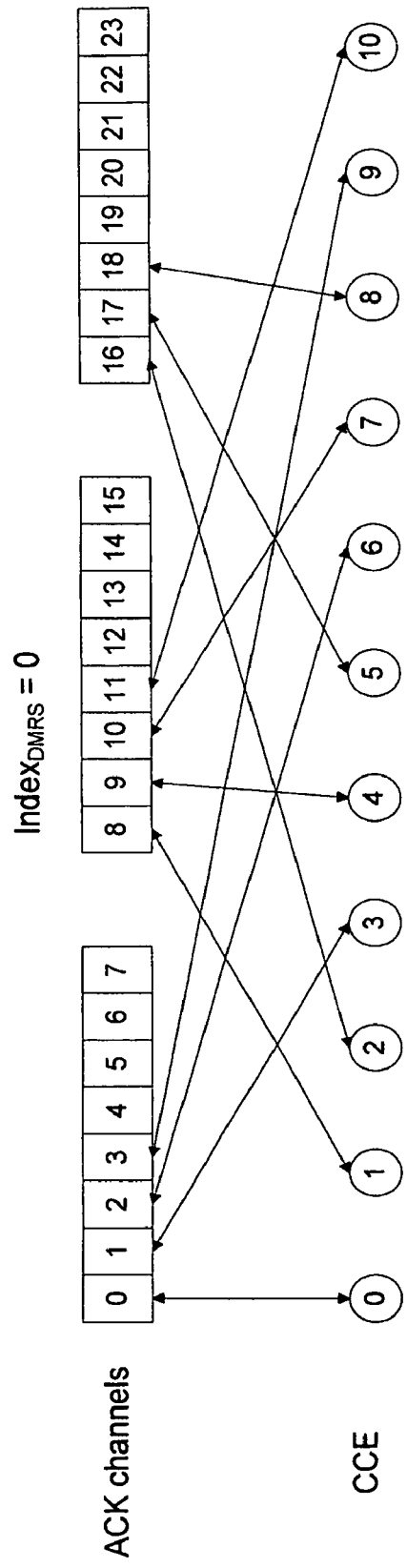
FIGS. 6(a)-(c) schematically illustrates linking schemes between the PHICH index and the CCE index, when the DMRS index is equal to 0, 1, 2, respectively, as an embodiment according to the principles of the present invention.
Figure 6B:
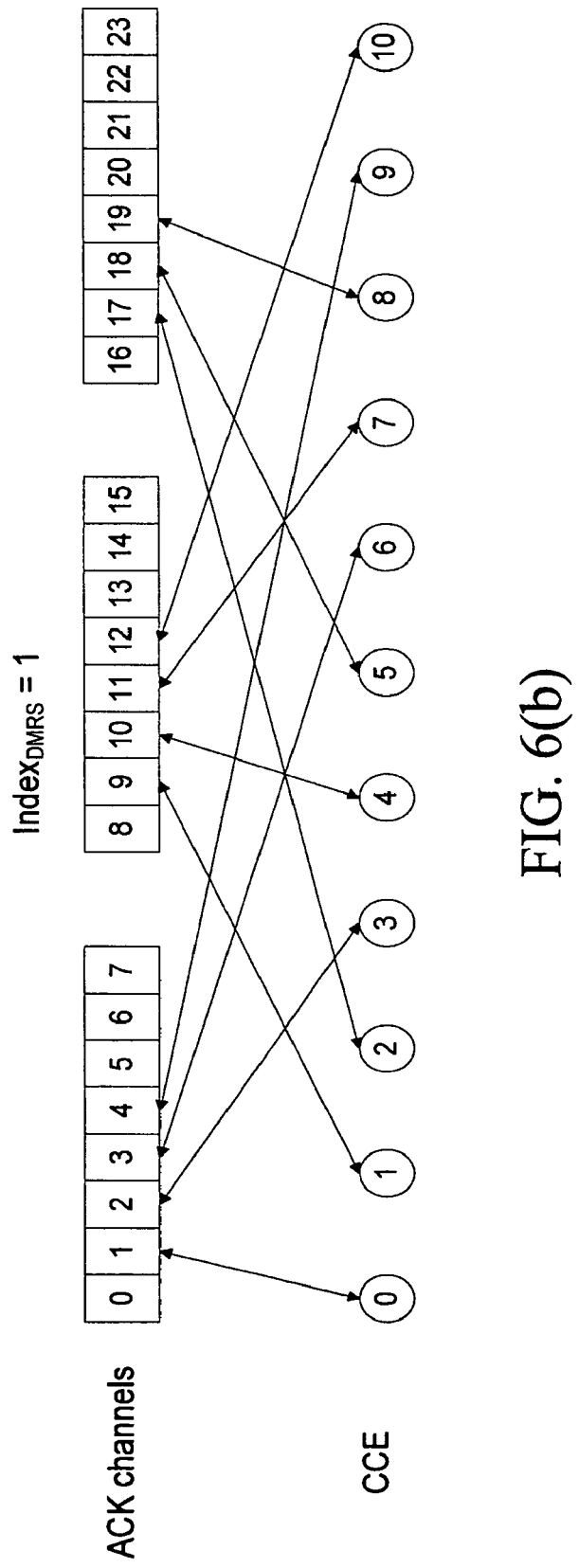
Figure 6C:
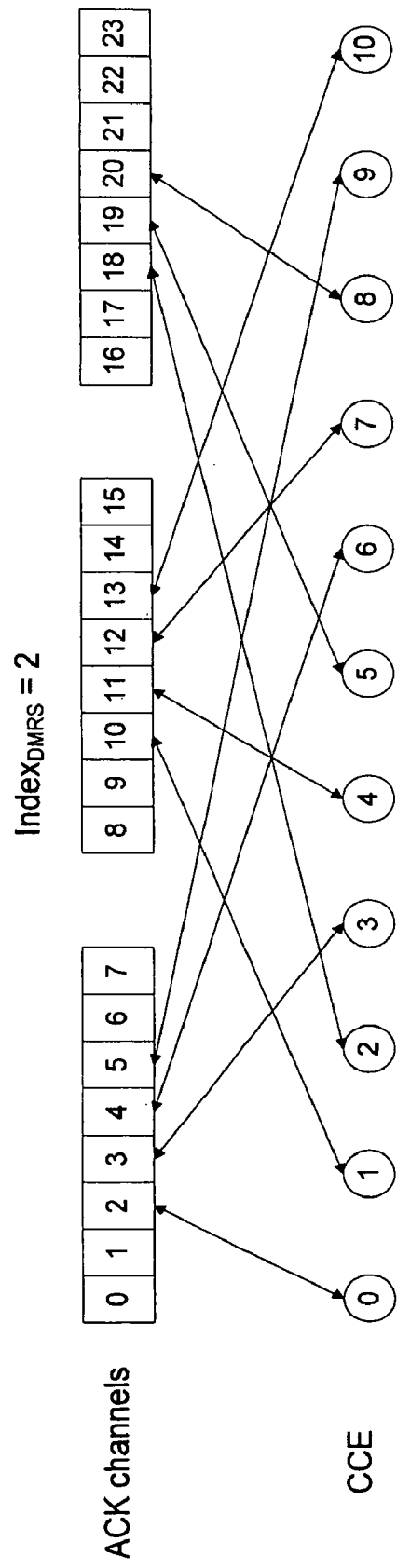

The effect of the linking scheme between the PHICH index and both of the CCE index and the DMRS index in Equations (3), (4), and (5) is shown in FIGS. 6(a)-6(c). FIG. 6(a) illustrates the linking scheme established based upon Equations (3), (4), and (5) when the DMRS index, $\text{Index}_{DMRS}$, is 0; FIG. 6(b) illustrates the linking scheme established when $\text{Index}_{DMRS}$ is 1; and FIG. 6(c) illustrates the linking scheme established when $\text{Index}_{DMRS}$ is 2.

Obviously, there can be many formulas other than those shown in Equation (3)~(6) to establish a linking or allocation scheme between the PHICH index and both of the CCE index and the DMRS index. For example, the PHICH allocation can be determined based on the index of the first CCE and the index of the DMRS as follows:

$$\text{Index}_{sequence} = \text{Index}_{DMRS} \quad (7)$$

$$\text{Index}_{group} = \text{Index}_{1st\ CCE} \% N_{group} \quad (8)$$

Based on Equation (7) and Equation (8), the PHICH index can be calculated as in Equation (1) or Equation (2). In other words, we can calculate the PHICH index by:

$$\text{Index}_{PHICH} = (\text{Index}_{1st\ CCE} \% N_{group}) \times S_{group} + \text{Index}_{DMRS} \quad (9)$$

or $$\text{Index}_{PHICH} = \text{Index}_{1st\ CCE} \% N_{group} + \text{Index}_{DMRS} \times N_{group} \quad (10)$$

Figure 7A:
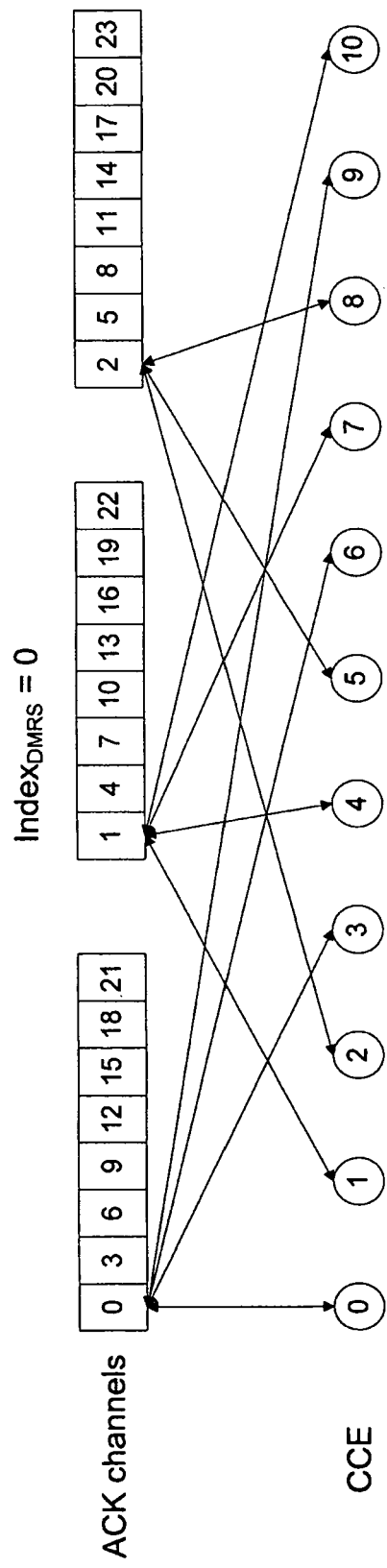
FIGS. 7(a)-(c) schematically illustrates linking schemes between the PHICH index and the CCE index, when the DMRS index is equal to 0, 1, 2, respectively, as another embodiment according to the principles of the present invention.
Figure 7B:
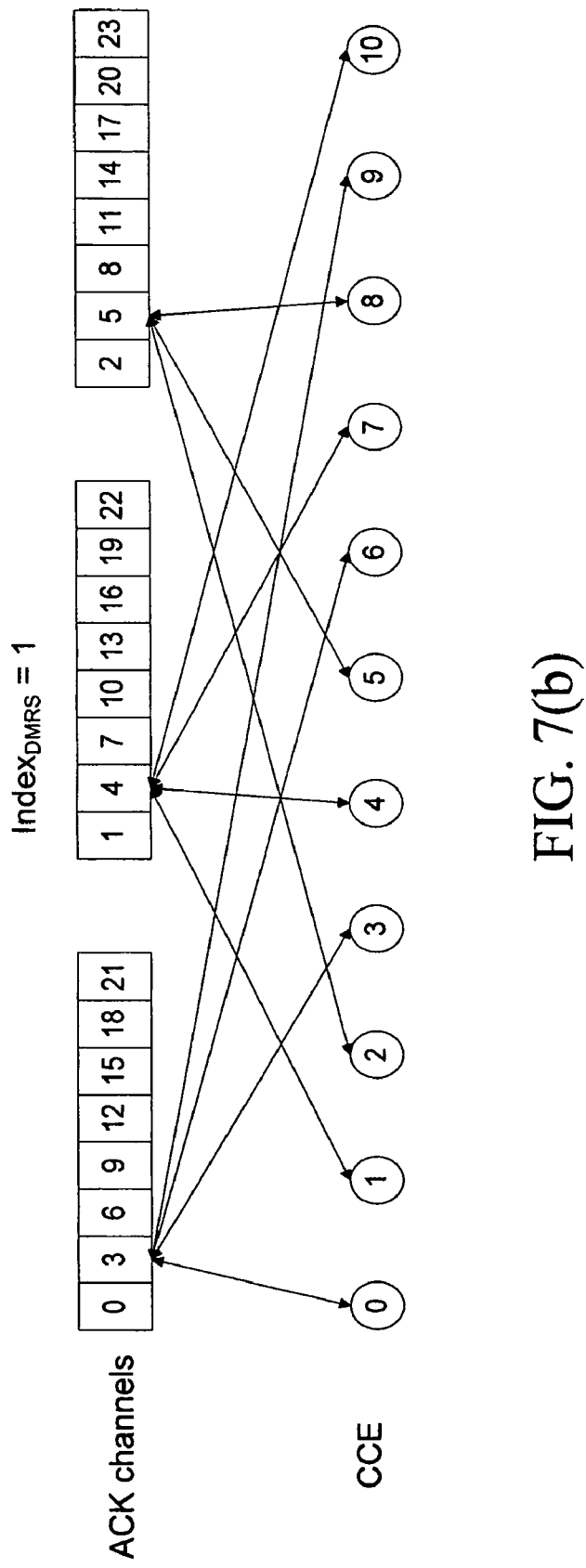
Figure 7C:
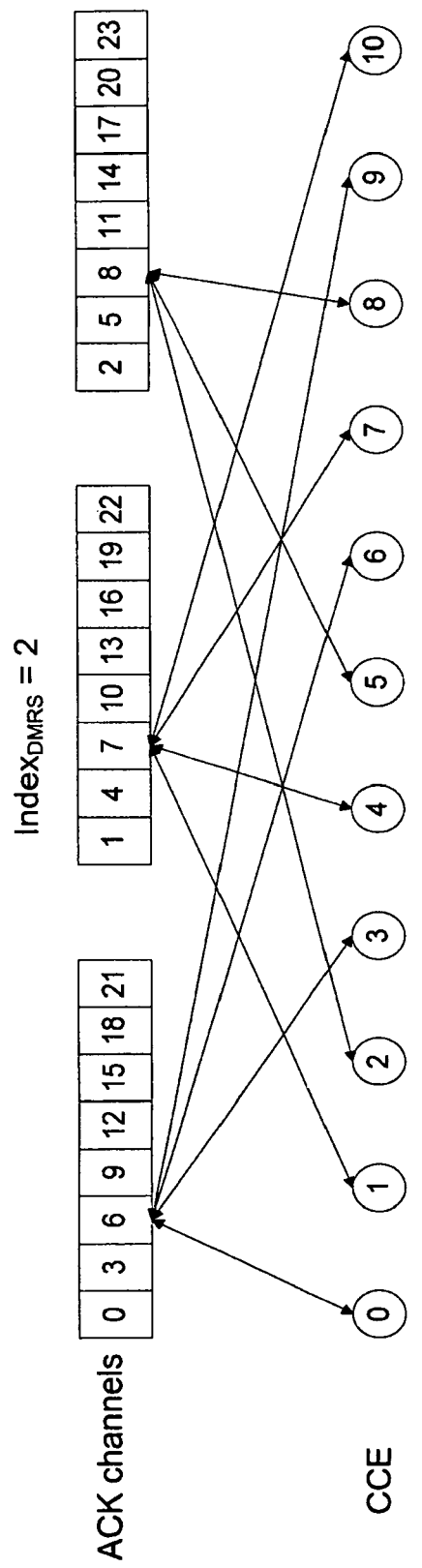

Based on Equation (7) and Equation (8), the PHICH index can be calculated as in Equation (1) or Equation (2). In other words, we can calculate the PHICH index by:

As an example, the effect of the linking scheme between the PHICH index and both of the CCE index and the DMRS index based on Equations (7), (8), (10) is shown in FIGS. 7(a)-7(c). FIG. 7(a) illustrates the linking scheme established based upon Equations (7), (8), and (10) when the DMRS index, $\text{Index}_{DMRS}$, is 0; FIG. 7(b) illustrates the linking scheme established when $\text{Index}_{DMRS}$ is 1; and FIG. 7(c) illustrates the linking scheme established when $\text{Index}_{DMRS}$ is 2.

Figure 8A:
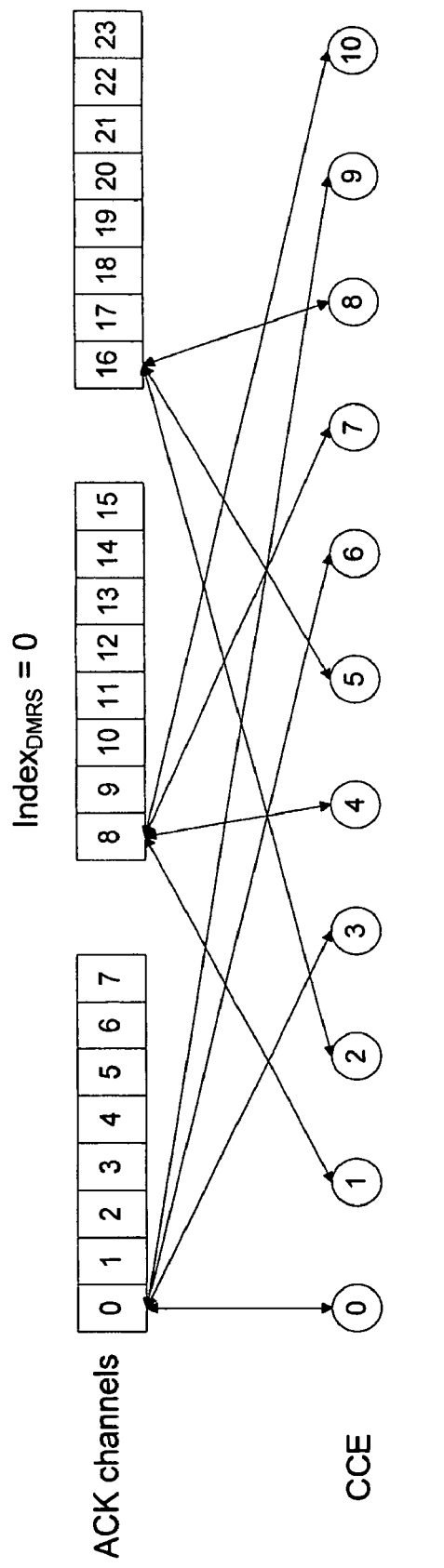
FIGS. 8(a)-(c) schematically illustrates linking schemes between the PHICH index and the CCE index, when the DMRS index is equal to 0, 1, 2, respectively, as still another embodiment according to the principles of the present invention.
Figure 8B:
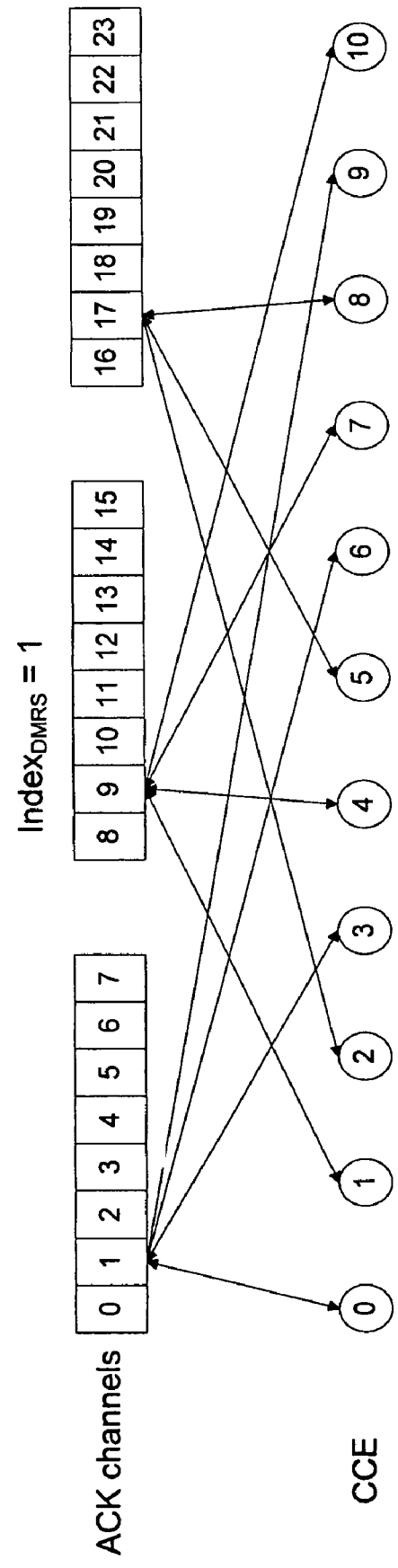
Figure 8C:
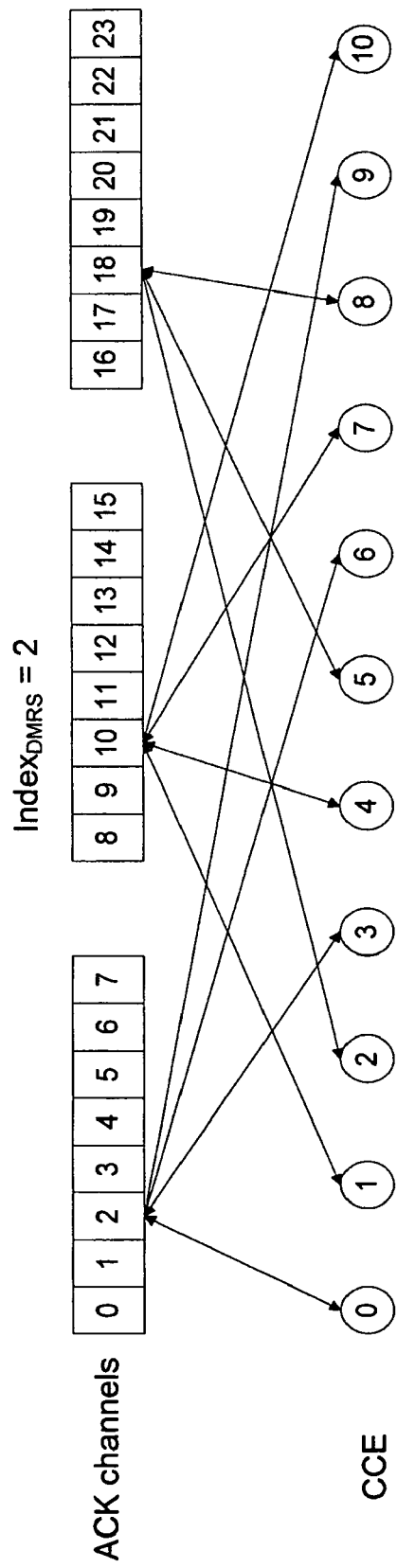

Similarly, as another example, the effect of the linking scheme between the PHICH index and both of the CCE index and the DMRS index based on Equation (7), (8), (9) is shown in FIGS. 8(a)-8(c).

Figure 9A:
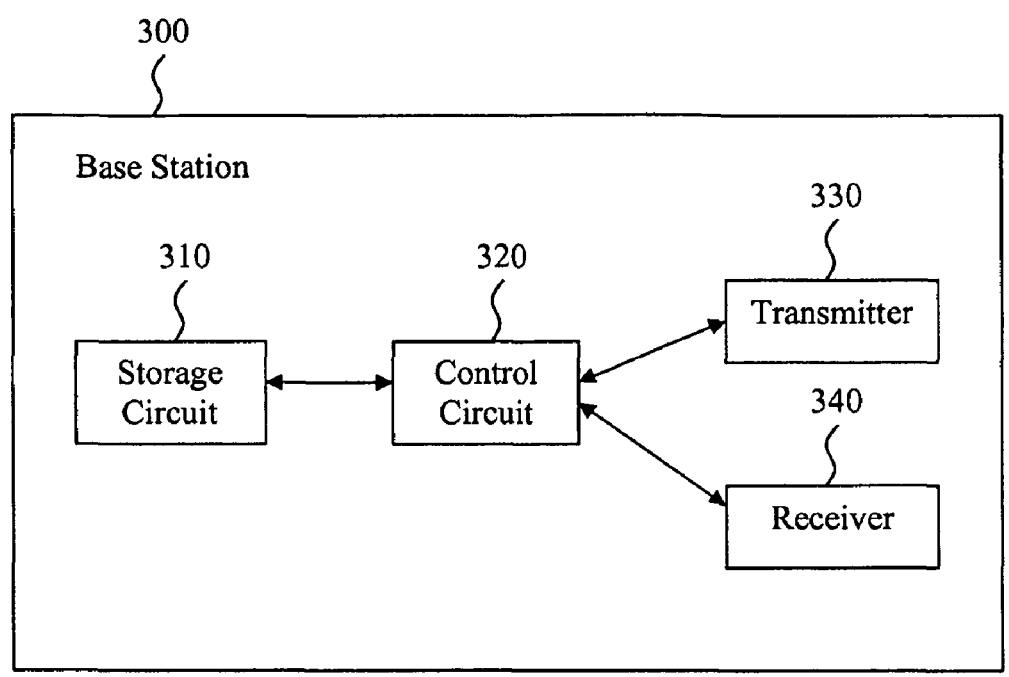
FIG. 9(a) schematically illustrates a base station for allocating the acknowledgement channels as an embodiment according to the principles of the present invention.
Figure 9B:
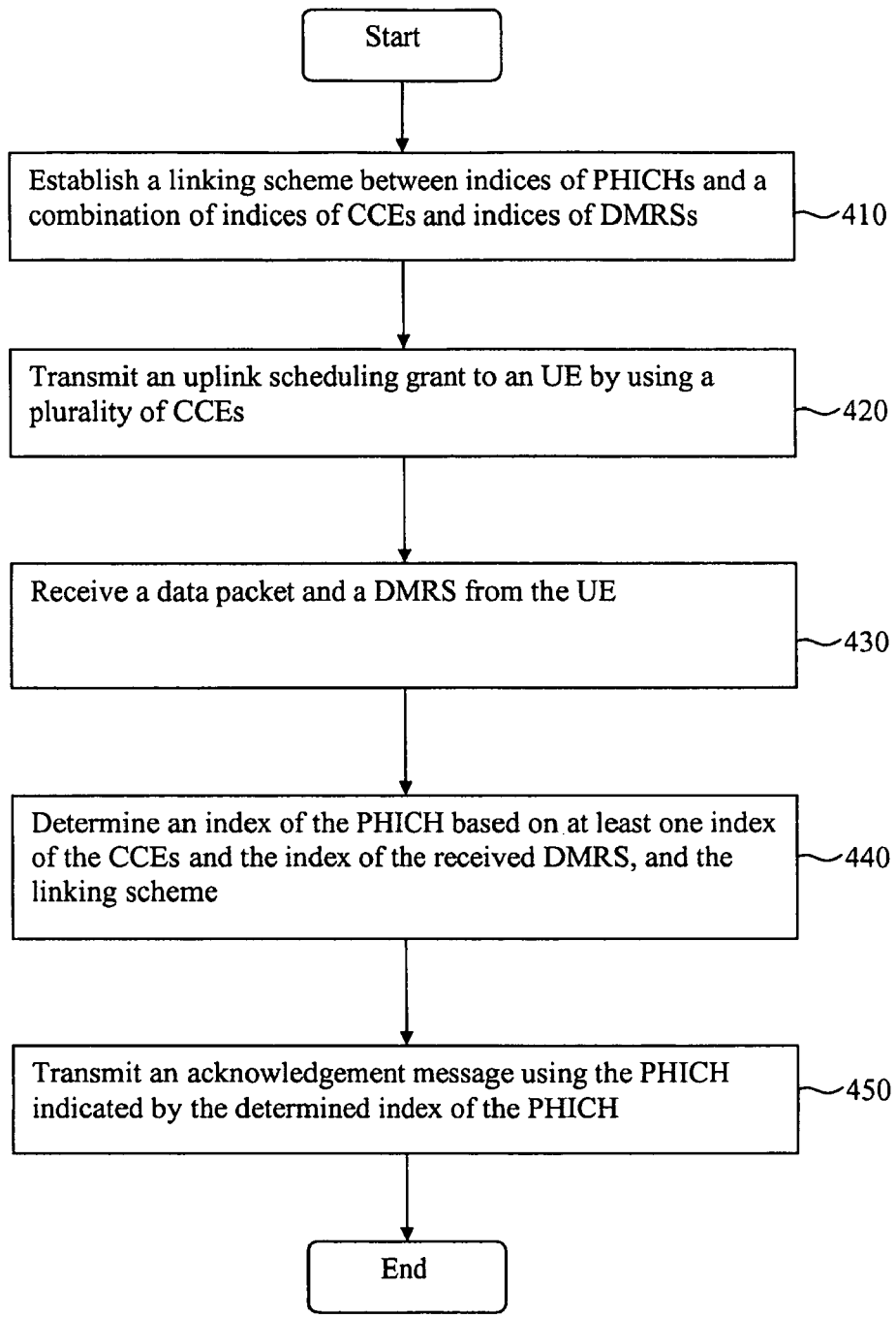
FIG. 9(b) is a flow chart outlining the procedure for acknowledgement channel allocation as an embodiment according to the principles of the present invention.

FIG. 9(a) schematically illustrates a base station for allocating the acknowledgement channels as an embodiment according to the principles of the present invention. FIG. 9(b) is a flow chart outlining the procedure for acknowledgement channel allocation as an embodiment according to the principles of the present invention. As shown in FIG. 9(a), base station 300 is constructed with a storage circuit 310, a control circuit 320, a transmitter 330 and a receiver 340. Turning to FIG. 9(b), first, storage circuit 310 stores the linking scheme established between indices of PHICHs, and a combination of indices of CCEs and indices of DMRS, via step 410. Transmitter 330 transmits a scheduling grant by using a plurality of CCEs to a unit of user equipment (UE) via step 420. Receiver 340 receives a data packet and a DMRS from the UE via step 430. Control circuit 320 determines an index of a PHICH within the plurality of PHICHs in dependence upon at least one index of the CCEs used to transmit the scheduling grant, and an index of the received DMRS in accordance with the linking scheme stored in storage circuit 310, via step 440. Transmitter 330 transmits an acknowledgement signal by using the PHICH indicated by the determined index of the PHICH via step 450.

The first embodiment of the present invention for determining the PHICH index may be implemented at both of the base station and the user equipment. At the UE side, when the UE receives an acknowledgement signal from the BS, the UE may determine the PHICH index in dependence upon the CCE index and the DMRS index. In this way, the UE knows which PHICH channel to listen to without the BS explicitly indicating the index of the PHICH channel. In order to receive the scheduling grant, the UE needs to decode the control channel. There are a limited number of CCEs or combinations of CCEs. The UE needs to try multiple hypotheses to determine on which CCE the scheduling grant is intended to be transmitted to the UE (this is typically called "blind decoding"). The UE will only be able to decode the scheduling grant that is transmitted to the UE. Once the UE decodes the scheduling grant, the UE may know the CCE index.

In a second embodiment according to the principles of the present invention, the PHICH that acknowledges an uplink transmission is allocated according to at least one index of the Physical Resource Blocks (PRB) used in transmitting the said uplink transmission, and the index of the demodulation reference signal (DMRS) used in the said uplink transmission. For example, the PHICH can be allocated by the first PRB index of the uplink transmission and the index of the DMRS. Note that the index of the DMRS can be broadly defined as the index of the DMRS sequence, or the index of the cyclic shift of the DMRS sequence, or the combination of both. Denote the index of the first PRB used for uplink transmission as $\text{Index}_{1st\ PRB}$. Denote the index of the DMRS for uplink transmission as $\text{Index}_{DMRS}$. The PHICH allocation can be determined by:

$$\text{Index}_{group} = \text{Index}_{1st\ PRB} \% N_{group} \quad (11)$$

$$\text{Index}_{sequence} = (\text{Index}_{DMRS} + \lfloor \text{Index}_{1st\ PRB}/N_{group} \rfloor)\% S_{group} \quad (12)$$

Denote the allocated PHICH index for the uplink HARQ process as $\text{Index}_{PHICH}$. Based on Equation (11) and Equation (12), the PHICH index can be calculated as in Equation (1) or Equation (2). In other words, we can calculate the PHICH index by:

$$\text{Index}_{PHICH} = (\text{Index}_{1st\ PRB} \% N_{group}) \times S_{group} + (\text{Index}_{DMRS} + \lfloor \text{Index}_{1st\ PRB}/N_{group} \rfloor)\% S_{group} \quad (13)$$

or $$\text{Index}_{PHICH} = \text{Index}_{1st\ PRB} \% N_{group} + ((\text{Index}_{DMRS} + \lfloor \text{Index}_{1st\ PRB}/N_{group} \rfloor)\% S_{group}) \times N_{group} \quad (14)$$

Figure 10A:
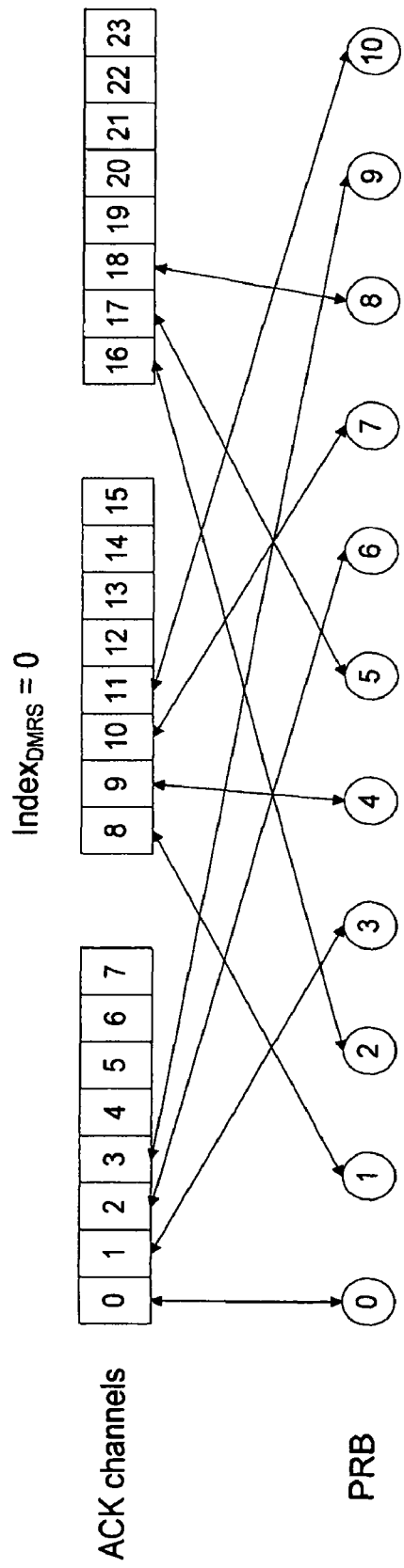
FIGS. 10(a)-(c) schematically illustrates linking schemes between the PHICH index and the PRB index, when the DMRS index is equal to 0, 1, 2, respectively, as an embodiment according to the principles of the present invention.
Figure 10B:
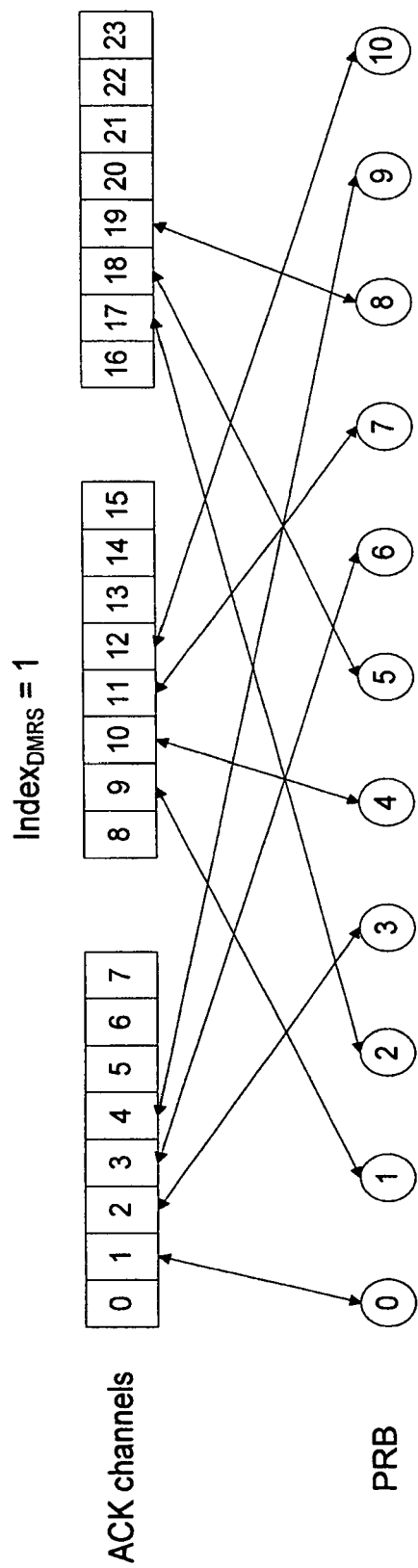
Figure 10C:
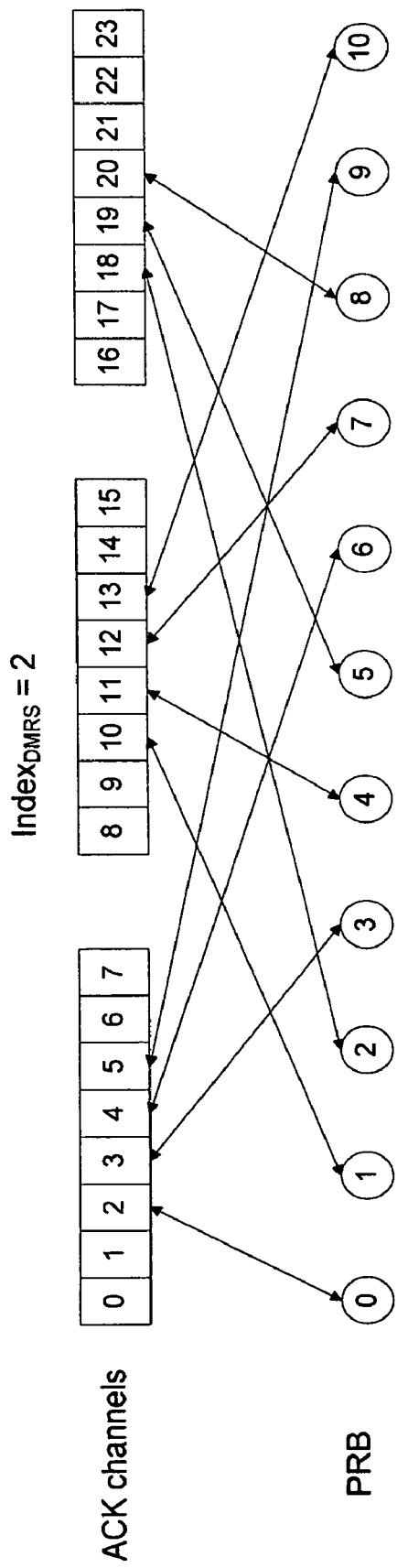

The effect of the linking scheme between the PHICH index and both of the PRB index and the DMRS index in Equations (11), (12), and (13) is shown in FIGS. 10(a)-10(c). FIG. 10(a) illustrates the linking scheme established based upon Equations (11), (12), and (13) when the DMRS index, $Index_{DMRS}$, is 0; FIG. 10(b) illustrates the linking scheme established when $Index_{DMRS}$ is 1; and FIG. 10(c) illustrates the linking scheme established when $Index_{DMRS}$ is 2.

Obviously, there can be many other formulas than those shown in Equation (11)~(14) to establish a linking or allocation scheme of PHICH by using the index of PRB and DMRS index. For example, the PHICH allocation can be determined based on the index of the first PRB and the index of the DMRS as follows:

$$Index_{sequence} = Index_{DMRS} \quad (15)$$

$$Index_{group} = Index_{1st\ PRB} \% N_{group} \quad (16)$$

Based on Equation (15) and Equation (16), the PHICH index can be calculated as in Equation (1) or Equation (2). In other words, we can calculate the PHICH index by:

$$Index_{PHICH} = (Index_{1st\ PRB} \% N_{group} \times S_{group} + Index_{DMRS}) \quad (17)$$

or, $$Index_{PHICH} = Index_{1st\ PRB} \% N_{group} + Index_{DMRS} \times N_{group} \quad (18)$$

Figure 11A:
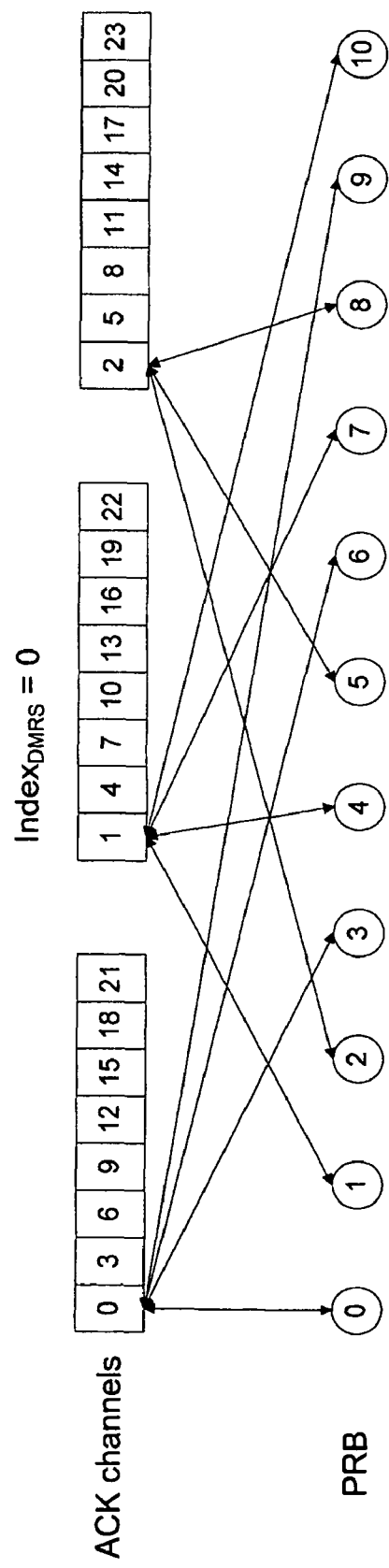
FIGS. 11(a)-(c) schematically illustrates linking schemes between the PHICH index and the PRB index, when the DMRS index is equal to 0, 1, 2, respectively, as another embodiment according to the principles of the present invention.
Figure 11B:
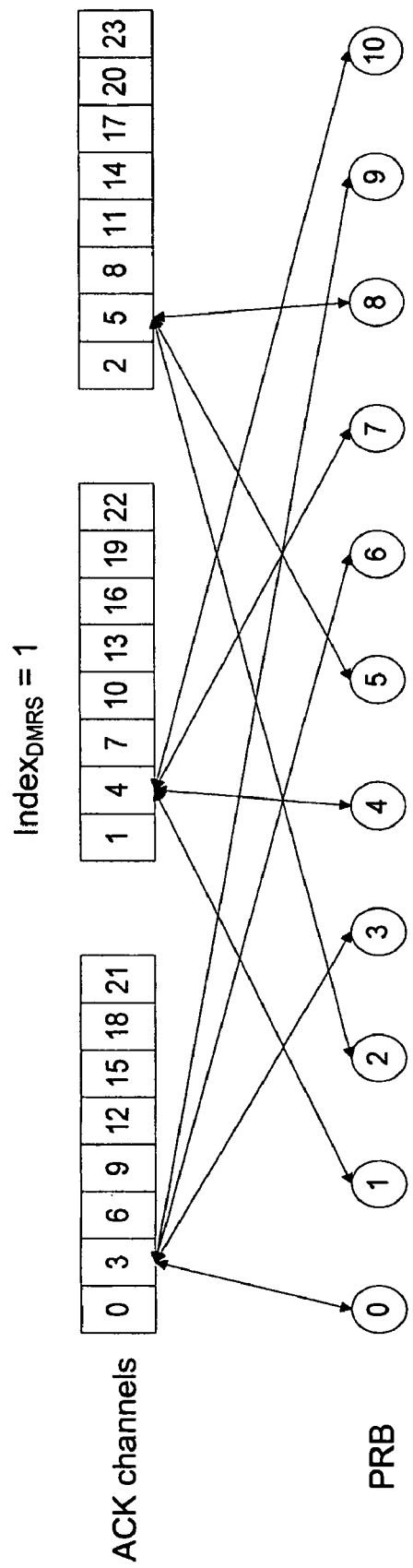
Figure 11C:
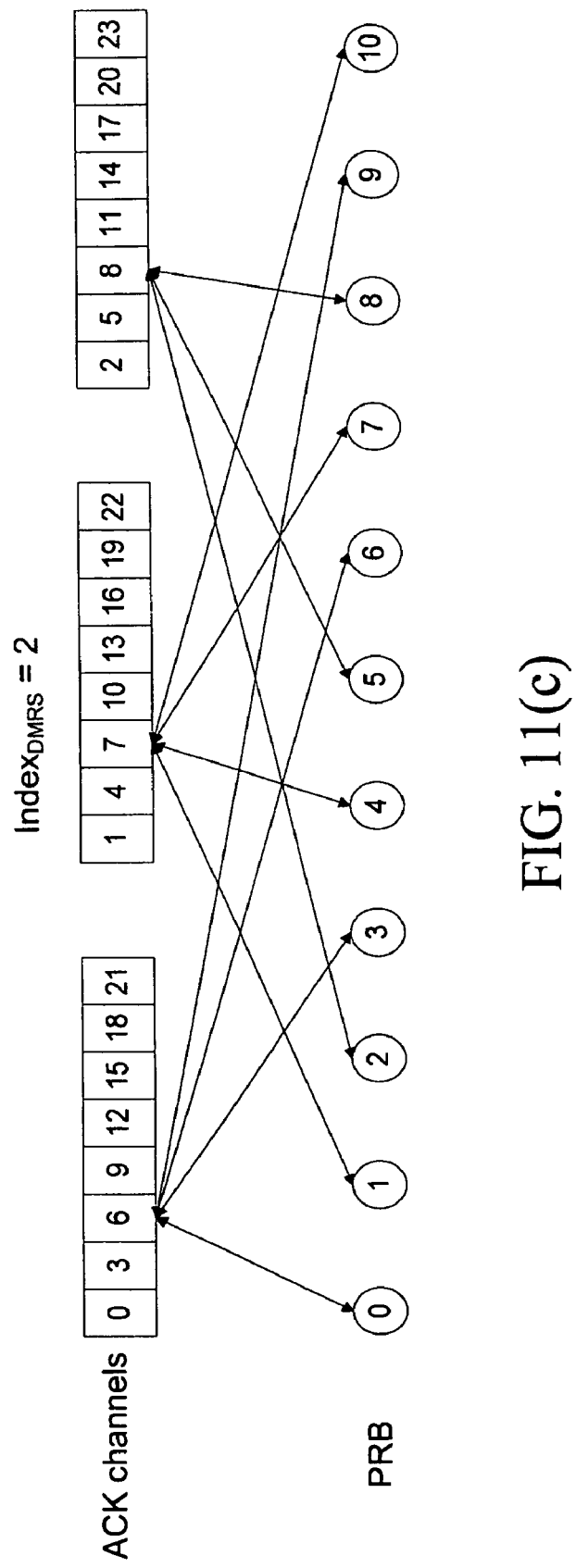
Figure 12A:
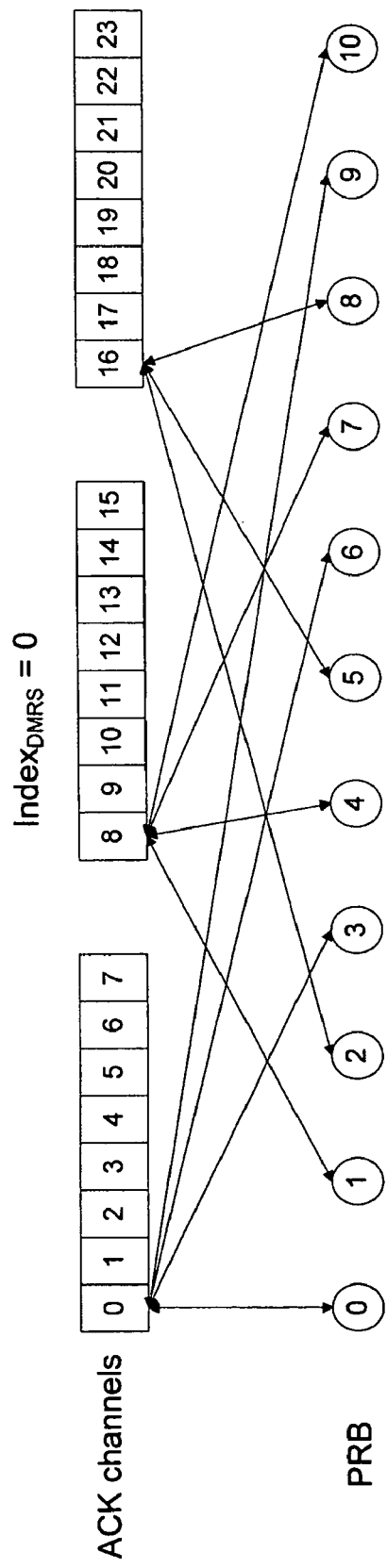
FIGS. 12(a)-(c) schematically illustrates linking schemes between the PHICH index and the PRB index, when the DMRS index is equal to 0, 1, 2, respectively, as still another embodiment according to the principles of the present invention.
Figure 12B:
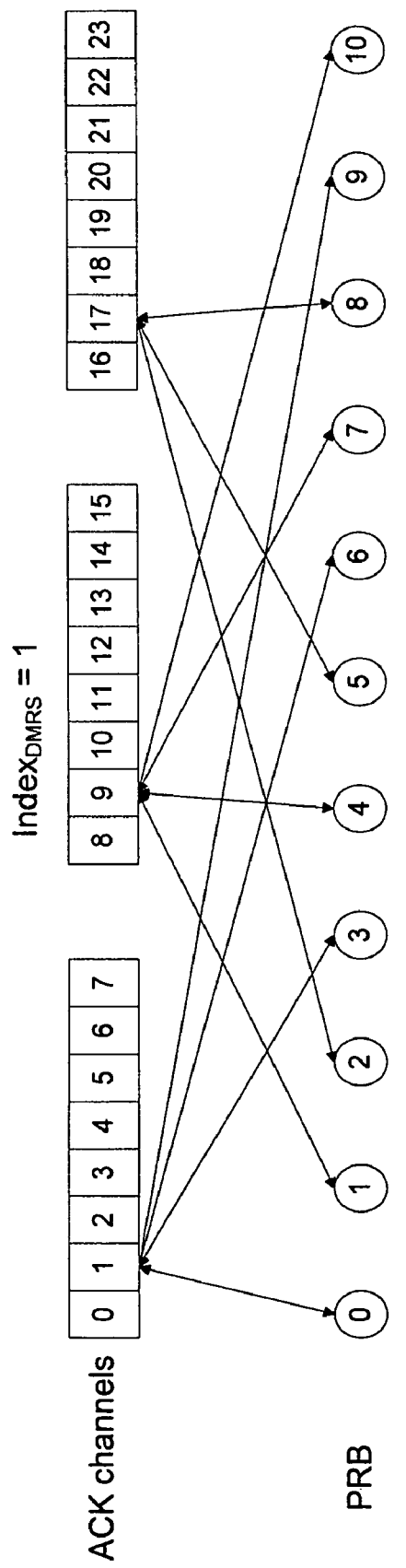
Figure 12C:
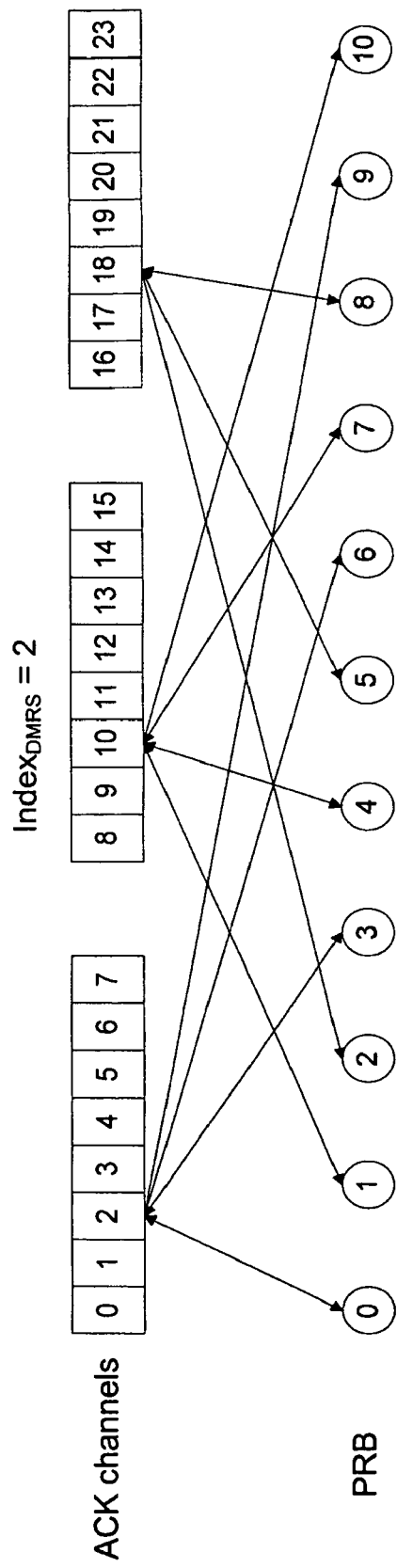

As an example, the effect of the linking scheme between the PHICH index and both of the PRB index and the DMRS index based on Equations (15), (16), (18) is shown in FIGS. 11(a)-11(c). FIG. 11(a) illustrates the linking scheme established based upon Equations (15), (16), (18) when the DMRS index, $Index_{DMRS}$, is 0; FIG. 11(b) illustrates the linking scheme established when $Index_{DMRS}$ is 1; and FIG. 11(c) illustrates the linking scheme established when $Index_{DMRS}$ is 2.

As another example, the effect of the linking scheme between the PHICH index and both of the PRB index and the DMRS index based on Equation (15), (16), (17) is shown in FIGS. 8(a)-8(c).

Figure 13:
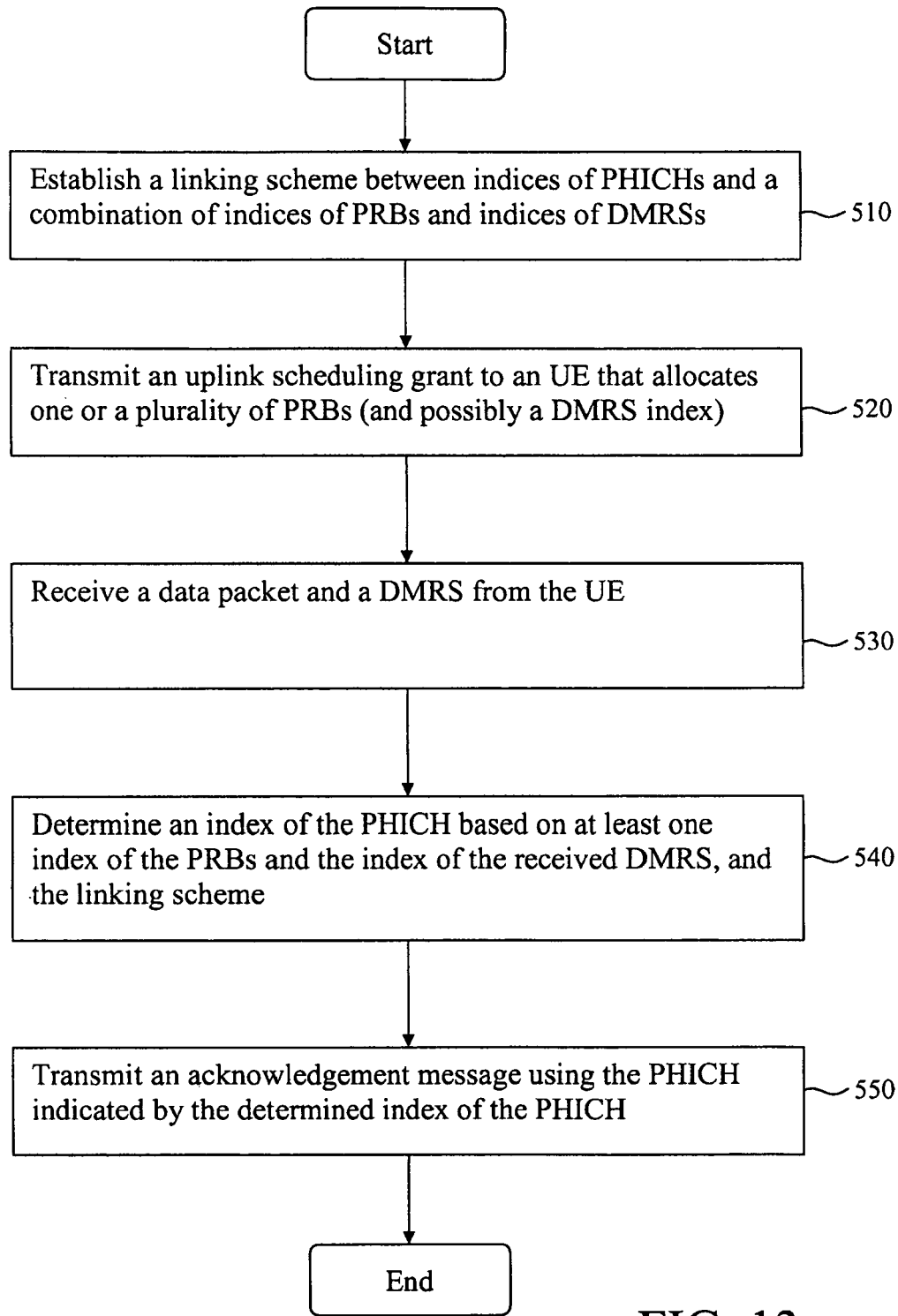
FIG. 13 is a flow chart outlining the procedure for acknowledgement channel allocation as another embodiment according to the principles of the present invention.

FIG. 13 is a flow chart outlining the procedure for acknowledgement channel allocation as the second embodiment according to the principles of the present invention. As shown in FIG. 13, first, a linking scheme is established between indices of PHICHs, and a combination of indices of PRBs and indices of DMRS, via step 510. A scheduling grant that allocates one or a plurality of PRBs is transmitted to a unit of user equipment (UE) via step 520. A data packet and a DMRS are received from the UE via step 530. An index of a PHICH within the plurality of PHICHs is determined in dependence upon at least one index of the PRBs used to transmit the data packet, and an index of the received DMRS in accordance with the linking scheme via step 540. Finally, an acknowledgement signal is transmitted by using the PHICH indicated by using the determined index of the PHICH via step 550.

Similarly, the second embodiment of the present invention for determining the PHICH index can be implemented at both of the base station and the user equipment. In this case, once the UE decodes the scheduling grant, the UE will know the indices of the PRB allocated for the UE to transmit on the uplink.

This invention provides schemes to allocation acknowledgement channels in an OFDM system. Both LTE and 802.16 standards employ acknowledgement channels in both downlink and uplink. The proposal of this invention optimizes the use of acknowledgement resources while minimizing the allocation and scheduling complexity. This scheme is therefore likely to be adopted either in LTE or future evolutions of this standard towards IMT-advanced. The proposal can also be applied to 802.16m standard as well.

While the present invention has been shown and described in connection with the preferred embodiments, it will be apparent to those skilled in the art that modifications and variations can be made without departing from the spirit and scope of the invention as defined by the appended claims.

What is claimed is:

1. A method for communication, the method comprising:
   establishing a linking scheme between indices of a plurality of physical hybrid automatic repeat-request indicator channels (PHICHs), and a combination of indices of control channel elements (CCEs) and indices of demodulation reference signals (DMRSs);
   transmitting a scheduling grant from a first node to a second node by using a plurality of CCEs;
   in response to receiving a data packet and a DMRS from the second node, determining, at the first node, an index of a PHICH within the plurality of PHICHs based on at least one index of the CCEs used to transmit the scheduling grant, and an index of the received DMRS according to the established linking scheme; and
   transmitting, from the first node to the second node, an acknowledgement signal by using the PHICH corresponding to the determined index of the PHICH.

2. The method of claim 1, further comprising:
   dividing the plurality of PHICHs equally into a plurality of PHICH groups; and
   wherein determining the index of the PHICH comprises determining, at the first node, the PHICH within the plurality of PHICHs based on a combination of an index of a first CCE used to transmit the scheduling grant, and the index of the received DMRS according to the established linking scheme.

3. The method of claim 2, wherein the index of the PHICH is determined based on an index of a PHICH group ($Index_{group}$) to which the PHICH belongs and an index of the PHICH ($Index_{sequence}$) within the PHICH group.

4. The method of claim 3, wherein the $Index_{group}$ is established by:

$$Index_{group} = Index_{1st\ CCE} \% N_{group}$$

wherein $Index_{1st\ CCE}$ denotes the index of the first CCE used to transmit the scheduling grant, % denotes a modulus operation, and $N_{group}$ denotes the quantity of the plurality of the PHICH groups.

5. The method of claim 3, wherein the $Index_{sequence}$ is established by:

$$Index_{sequence} = (Index_{DMRS} + \lfloor Index_{1st\ CCE}/N_{group} \rfloor) \% S_{group}$$

wherein $Index_{1st\ CCE}$ denotes the index of the first CCE used to transmit the scheduling grant, $Index_{DMRS}$ denotes the index of the received DMRS, $N_{group}$ denotes the quantity of the plurality of the PHICH groups, % denotes a modulus operation, $\lfloor x \rfloor$ denotes an operation for selecting the largest integer smaller than x, and $S_{group}$ denotes the quantity of the PHICHs in each group.

6. The method of claim 3, wherein the $Index_{sequence}$ is established by:

$$Index_{sequence} = Index_{DMRS},$$

wherein $Index_{DMRS}$ denotes the index of the received DMRS.

7. The method of claim 3, wherein the $Index_{group}$ is established by:

$$Index_{group} = Index_{1st\ CCE} \% N_{group},$$

wherein $\text{Index}_{1st\ CCE}$ denotes the index of the first CCE used to transmit the scheduling grant, % denotes a modulus operation, and $N_{group}$ denotes the quantity of the plurality of the PHICH groups.

8. A method for communication, the method comprising:
transmitting a scheduling grant from a first node to a second node to allocate a plurality of physical resource blocks (PRBs) to the second node for transmission of a data packet;
in response to receiving a data packet and a demodulation reference signal (DMRS) from the second node, determining, at the first node, an index of a physical hybrid automatic repeat-request indicator channel (PHICH) within a plurality of PHICHs based on at least one index of the PRBs used to transmit the data packet, and an index of the received DMRS according to a linking scheme between indices of the plurality of PHICHs and a combination of indices of PRBs and indices of DMRSs; and
transmitting, from the first node to the second node, an acknowledgement signal by using the PHICH corresponding to the determined index of the PHICH.

9. The method of claim 8, further comprising:
dividing the plurality of PHICHs equally into a plurality of PHICH groups; and
wherein determining the index of the PHICH comprises determining, at the first node, the PHICH within the plurality of PHICHs based on a combination of an index of a first PRB used to transmit the data packet, and the index of the received DMRS according to the linking scheme.

10. The method of claim 9, wherein the index of the PHICH is determined by an index of a PHICH group ($\text{Index}_{group}$) to which the PHICH belongs and an index of the PHICH ($\text{Index}_{sequence}$) within the PHICH group.

11. The method of claim 10, wherein the $\text{Index}_{group}$ is established by:

$$\text{Index}_{group} = \text{Index}_{1st\ PRB} \% N_{group}$$

wherein $\text{Index}_{1st\ PRB}$ denotes the index of the first PRB used to transmit the data packet, % denotes a modulus operation, and $N_{group}$ denotes the quantity of the plurality of the PHICH groups.

12. The method of claim 10, wherein the $\text{Index}_{sequence}$ is established by:

$$\text{Index}_{sequence} = (\text{Index}_{DMRS} + \lfloor \text{Index}_{1st\ PRB}/N_{group} \rfloor)\% S_{group}$$

wherein $\text{Index}_{1st\ PRB}$ denotes the index of the first PRB used to transmit the data packet, $\text{Index}_{DMRS}$ denotes the index of the received DMRS, $N_{group}$ denotes the quantity of the plurality of groups of the PHICH groups, % denotes a modulus operation, $\lfloor x \rfloor$ denotes an operation for selecting the largest integer smaller than x, and $S_{group}$ denotes the quantity of the PHICHs in each group.

13. The method of claim 10, wherein the $\text{Index}_{sequence}$ is established by:

$$\text{Index}_{sequence} = \text{Index}_{DMRS}$$

wherein $\text{Index}_{DMRS}$ denotes the index of the received DMRS.

14. A base station in a communication network, comprising:
a circuit configured to establish a linking scheme between indices of a plurality of physical hybrid automatic repeat-request indicator channels (PHICHs), and a combination of indices of control channel elements (CCEs) and indices of demodulation reference signals (DMRSs);
a transmitter configured to transmit a scheduling grant by using a plurality of CCEs to a user equipment;
a receiver configured to receive a data packet and a DMRS from the user equipment; and
a controller configured to determine an index of a PHICH within the plurality of PHICHs based on at least one index of the CCEs used to transmit the scheduling grant, and an index of the received DMRS according to the established linking scheme,
wherein the transmitter is further configured to transmit an acknowledgement signal by using the PHICH corresponding to the determined index of the PHICH.

15. The base station of claim 14, wherein the controller is further configured to determine the PHICH within the plurality of PHICHs based on a combination of an index of a first CCE used to transmit the scheduling grant, and the index of the received DMRS according to the established linking scheme.

16. A base station in a communication network, comprising:
a transmitter configured to transmit a scheduling grant allocating a plurality of physical resource blocks (PRBs) to a user equipment;
a receiver configured to receive a data packet and a demodulation reference signal (DMRS) from the user equipment; and
a control circuit configured to determine an index of a physical hybrid automatic repeat-request indicator channel (PHICH) within a plurality of PHICHs based on at least one index of the PRBs used to transmit the data packet, and an index of the received DMRS according to a linking scheme between indices of the plurality of PHICHs and a combination of indices of PRBs and indices of DMRSs,
wherein the transmitter is further configured to transmit an acknowledgement signal by using the PHICH corresponding to the determined index of the PHICH.

17. The base station of claim 16, wherein the controller is further configured to determine the PHICH within the plurality of PHICHs based on a combination of an index of a first PRB used to transmit the data packet, and the index of the received DMRS according to the linking scheme.

18. The base station of claim 17, wherein the controller is further configured to equally divide the plurality of PHICHs into a plurality of PHICH groups, and determine the index of the PHICH based on an index of a PHICH group ($\text{Index}_{group}$) that to which the PHICH belongs and an index of the PHICH ($\text{Index}_{sequence}$) within the PHICH group.

19. The base station of claim 18, wherein the $\text{Index}_{group}$ is established by:

$$\text{Index}_{group} = \text{Index}_{1st\ PRB} \% N_{group}$$

wherein $\text{Index}_{1st\ PRB}$ denotes the index of the first PRB used to transmit the data packet, % denotes a modulus operation, and $N_{group}$ denotes the quantity of the plurality of the PHICH groups.

20. The base station of claim 15, wherein the controller is further configured to equally divide the plurality of PHICHs into a plurality of PHICH groups, and determine the index of the PHICH based on an index of a PHICH group ($\text{Index}_{group}$) that to which the PHICH belongs and an index of the PHICH ($\text{Index}_{sequence}$) within the PHICH group.

21. The method of 8, wherein the at least one index of the PRBs is the lowest PRB index among the PRBs used to transmit the data packet.

22. The base station of claim 16, wherein the at least one index of the PRBs is the lowest PRB index among the PRBs used to transmit the data packet.

23. A method for communication, the method comprising:
receiving, by a second node, a scheduling grant from a first node to allocate one or more physical resource blocks (PRBs) for transmission of a data packet;
transmitting, by the second node, a data packet and a demodulation reference signal (DMRS) to the first node via the one or more allocated PRBs;
determining, by the second node, an index of a physical hybrid automatic repeat-request indicator channel (PHICH) among a plurality of PHICHs based on at least one index of the PRBs and an index of the transmitted DMRS; and
receiving, by the second node, an acknowledgement signal using the PHICH corresponding to the determined index of the PHICH.

24. The method of claim 23, wherein the at least one or more PRBs includes the lowest PRB index among the PRBs.

25. The method of claim 23, wherein the index of the transmitted DMRS is a cyclic shift index of the transmitted DMRS.

26. A communication device in a communication network, comprising:
a receiver configured to receive a scheduling grant to allocate one or more physical resource blocks (PRBs) for transmission of a data packet;
a transmitter configured to transmit a data packet and a demodulation reference signal (DMRS) via the one or more allocated PRBs;
a control circuit configured to determine an index of a physical hybrid automatic repeat-request indicator channel (PHICH) among a plurality of PHICHs based on at least one index of the PRBs and an index of the transmitted DMRS,
wherein the receiver is further configured to receive an acknowledgement signal using the PHICH corresponding to the determined index of the PHICH.

27. The communication device of claim 26, wherein the at least one or more PRBs includes the lowest PRB index among the PRBs.

28. The communication device of claim 26, wherein the index of the transmitted DMRS is a cyclic shift index of the transmitted DMRS.

* * * * *